(12) United States Patent
Takayama

(10) Patent No.: US 6,619,753 B2
(45) Date of Patent: Sep. 16, 2003

(54) CAR SEAT HAVING BUCKLE WITH VISUAL FEEDBACK

(75) Inventor: Steven R. Takayama, Atherton, CA (US)

(73) Assignee: Evenflo Company, Inc., Vandalia, OH (US)

( * ) Notice: Subject to any disclaimer, the term of this patent is extended or adjusted under 35 U.S.C. 154(b) by 0 days.

(21) Appl. No.: 09/975,950

(22) Filed: Oct. 11, 2001

(65) Prior Publication Data

US 2002/0089228 A1 Jul. 11, 2002

Related U.S. Application Data

(60) Provisional application No. 60/239,497, filed on Oct. 11, 2000.

(51) Int. Cl.[7] .............................................. A47C 31/00
(52) U.S. Cl. .................... 297/484; 297/483; 297/250.1; 24/631
(58) Field of Search ................................ 297/483, 484, 297/250.1; 24/631, 632; 280/801.1, 808

(56) References Cited

U.S. PATENT DOCUMENTS

| | | | |
|---|---|---|---|
| 3,768,862 A | 10/1973 | Williams, Jr. | |
| 4,624,033 A | 11/1986 | Orton | |
| 4,646,400 A * | 3/1987 | Tanaka | 24/632 |
| 4,731,912 A | 3/1988 | Boriskie et al. | |
| 4,979,777 A | 12/1990 | Takada | |
| 5,149,189 A | 9/1992 | Kawamura | |
| 5,220,713 A | 6/1993 | Lane, Jr. et al. | |
| 5,269,051 A * | 12/1993 | McFalls | 24/632 |
| 5,380,067 A | 1/1995 | Turvill et al. | |
| 5,395,160 A | 3/1995 | Krebs et al. | |
| 5,606,783 A * | 3/1997 | Gillis et al. | 24/628 |
| 5,742,986 A | 4/1998 | Corrion et al. | |
| 5,749,130 A | 5/1998 | Bilyeu et al. | |
| 5,882,084 A | 3/1999 | Verellen et al. | |
| 5,898,366 A | 4/1999 | Brown et al. | |
| 5,908,223 A * | 6/1999 | Miller | 297/467 |
| 5,966,784 A | 10/1999 | Arbogast et al. | |
| 5,970,587 A | 10/1999 | Knox | |
| 6,079,744 A | 6/2000 | Husby et al. | |
| 6,309,024 B1 * | 10/2001 | Busch | 297/484 |
| 6,367,882 B1 * | 4/2002 | Van Druff et al. | 297/467 |
| 6,457,774 B2 * | 10/2002 | Baloga | 297/250.1 |

* cited by examiner

Primary Examiner—Peter M. Cuomo
Assistant Examiner—Erika Garrett
(74) Attorney, Agent, or Firm—Taft, Stettinius & Hollister LLP

(57) ABSTRACT

A car seat including a seat body having a seat back and a seat pan for receiving an occupant thereon, and at least one shoulder harness coupled to the seat body and being located to fit over the torso of an occupant to retain the occupant on the seat body. The car seat further includes a buckle for releasably coupling the shoulder harness to the seat body, the buckle including a bracket coupled to the shoulder harness and a base coupled to the seat body. The bracket includes a gripping portion and a tongue and is releasably couplable to the base. The buckle is in a latched condition when the bracket is coupled to the base and is in an unlatched condition when the bracket is not coupled to the base. One of the gripping portion or the base includes a notification portion that has a visual property different from any adjacent areas of the one of the gripping portion or the base. The notification portion is visible when the buckle is in the unlatched condition and the visual property of the notification portion is generally obscured by the other of the gripping portion or the base when the buckle is in the latched condition.

21 Claims, 7 Drawing Sheets

CAR SEAT HAVING BUCKLE WITH VISUAL FEEDBACK

This application claims priority to U.S. Provisional App. Ser. No. 60/239,497, filed Oct. 11, 2000, the contents of which are hereby incorporated by reference.

The present invention is directed to a car seat having a buckle, and more particularly, to a car seat having a buckle which provides visual feedback to confirm when the buckle is properly latched.

BACKGROUND OF THE INVENTION

Car seats are designed to be coupled to the seat of an automotive vehicle and are shaped to securely receive a child or infant therein. A car seat typically includes a seat shell or seat body having a seat back and a seat pan. A pair of harnesses extend from the seat back, over the shoulders of the occupant, and are releasably coupled to a buckle connected to the seat pan to securely retain the occupant in the car seat.

The harnesses of a car seat are typically latched in place by a buckle. When the harnesses are received therein, the buckle should be securely latched to ensure the occupant is secured in the car seat. Therefore, it is important to confirm that the buckle is securely latched in place.

SUMMARY OF THE INVENTION

The present invention is a car seat having a buckle that provides visual feedback to confirm when the buckle is securely latched. In a one embodiment, the invention is a car seat including a seat body having a seat back and a seat pan for receiving an occupant thereon, and at least one shoulder harness coupled to the seat body and being located to fit over the torso of an occupant to retain the occupant on the seat body. The car seat further includes a buckle for releasably coupling the shoulder harness to the seat body, the buckle including a bracket coupled to the shoulder harness and a base coupled to the seat body. The bracket includes a gripping portion and a tongue and is releasably couplable to the base. The buckle is in a latched condition when the bracket is coupled to the base and is in an unlatched condition when the bracket is not coupled to the base. One of the gripping portion or the base includes a notification portion that has a visual property different from any adjacent areas of the one of the gripping portion or the base. The notification portion is visible when the buckle is in the unlatched condition and the visual property of the notification portion is generally obscured by the other of the gripping portion or the base when the buckle is in the latched condition.

Other objects and advantages of the present invention will be apparent from the following description and the accompanying drawings.

DETAILED DESCRIPTION

Figure 1:
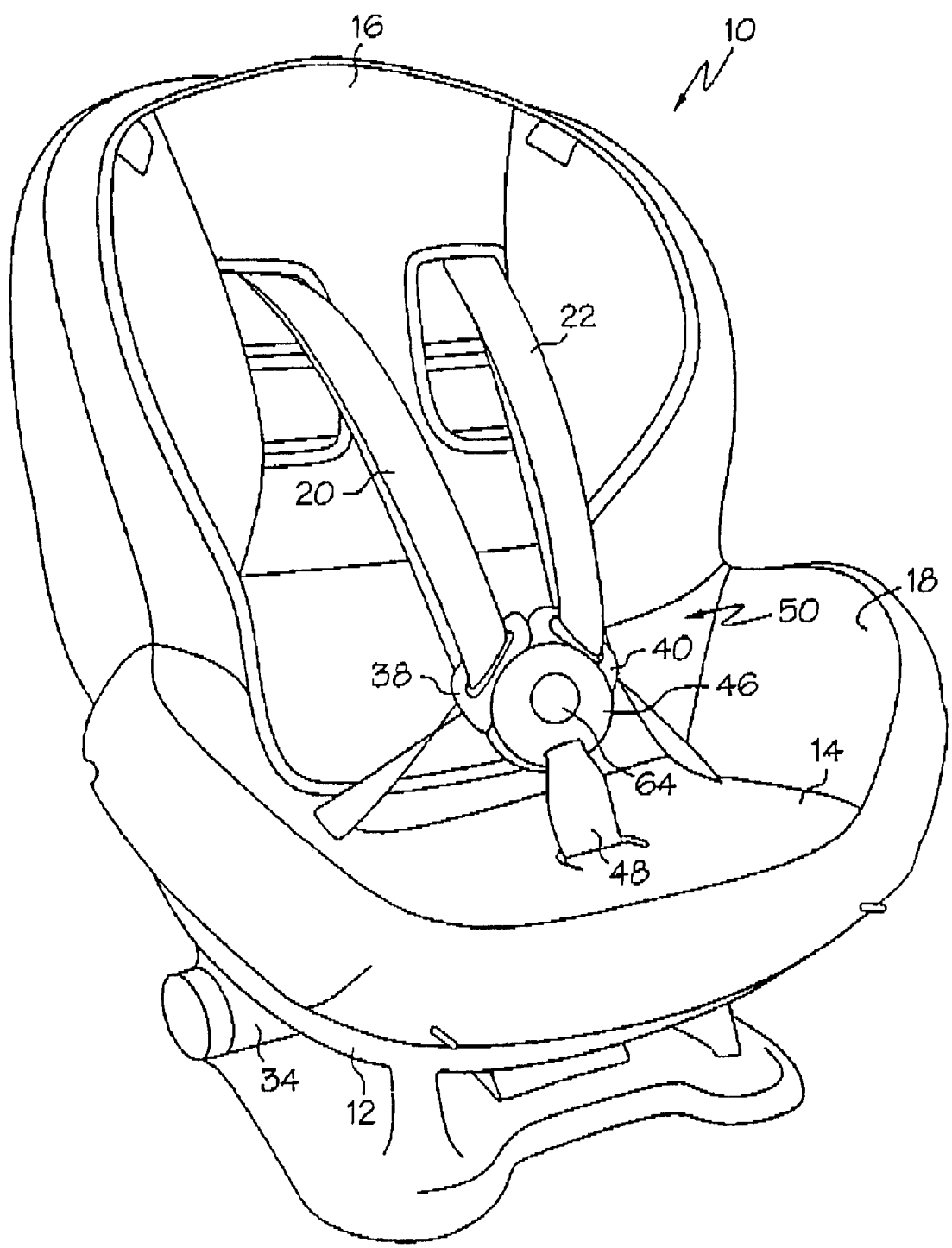
FIG. 1 is a front perspective view of one embodiment of the car seat of the present invention, shown in its latched condition.
Figure 2:
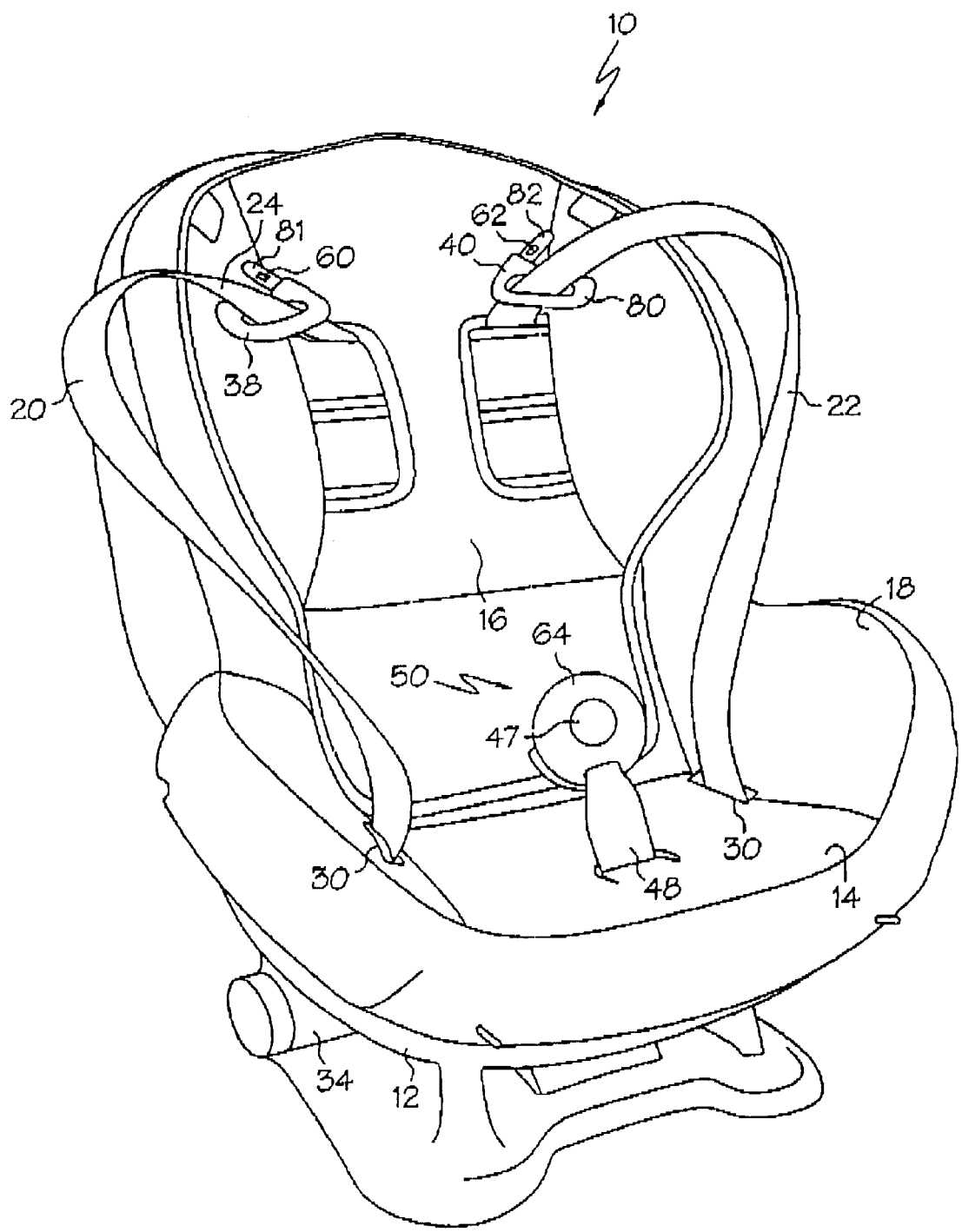
FIG. 2 is a front perspective view of the car seat of FIG. 1, shown in its unlatched condition.
Figure 3:
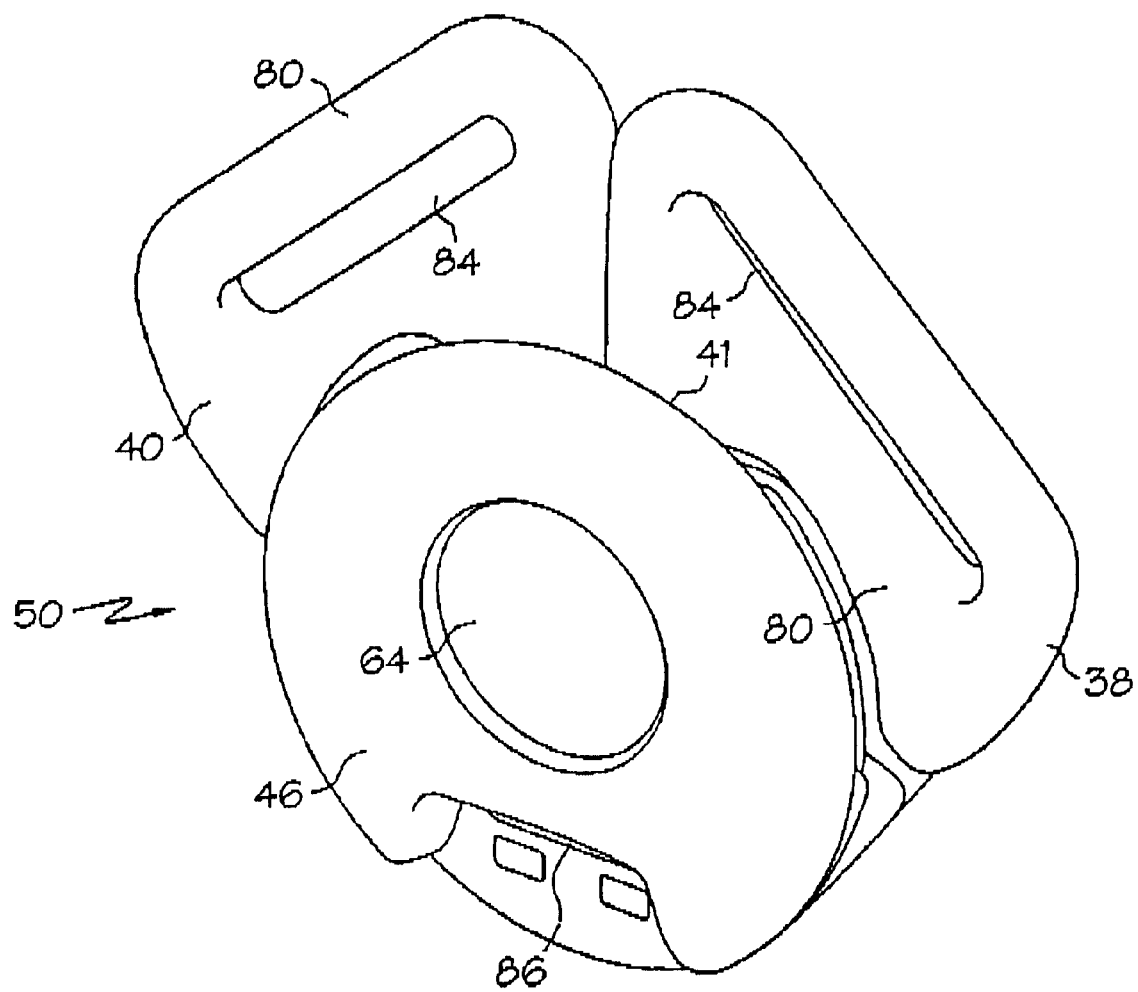
FIG. 3 is a front perspective view of the buckle of the car seat of FIG. 1.

As shown in FIGS. 1 and 2, the present invention is a car seat, generally designated 10, having a relatively rigid shell or seat body 12 having a seat pan 14 and a seat back 16. The car seat 10 may include a layer of cushioned material 18 tightly fit around the shell 12 to provide comfort to the occupant.

The car seat 10 includes a pair of belts or shoulder harnesses 20, 22 that are shaped and located to fit around the shoulder or torso of an occupant to retain the occupant on the seat pan 14. Each harness 20, 22 may be passed through one of a pair of openings 30, 32 (see FIG. 2) in the seat pan 14 and wrapped around a rotatable spool 34 located below the seat pan 14. The spool 34 preferably includes a releasable ratchet mechanism such that the spool 34 can be rotated to tighten the harnesses 20, 22. The spool 34 also preferably includes a tension release mechanism (not shown) that can be actuated to enable the spool 34 to rotate in a direction to loosen the tension in the harnesses 20, 22. However, a wide variety of tensioning mechanisms, besides the spool 34, may be used without departing from the scope of the invention.

The car seat 10 includes a buckle 50 for releasably coupling the harnesses 20, 22 to the seat pan 14. The buckle 50 includes a pair of brackets 38, 40, and each bracket 38, 40 is slidingly and/or directly coupled to the associated shoulder harness 20, 22. Each bracket 38, 40 includes a gripping portion 80 and a generally downwardly extending tongue 81, 82. Each gripping portion 80 has an upper loop 84 formed therein that is shaped to receive a harness 20, 22 therethrough. Each tongue 81, 82 has an opening 60, 62 formed therein (see FIG. 6).

Figure 6:
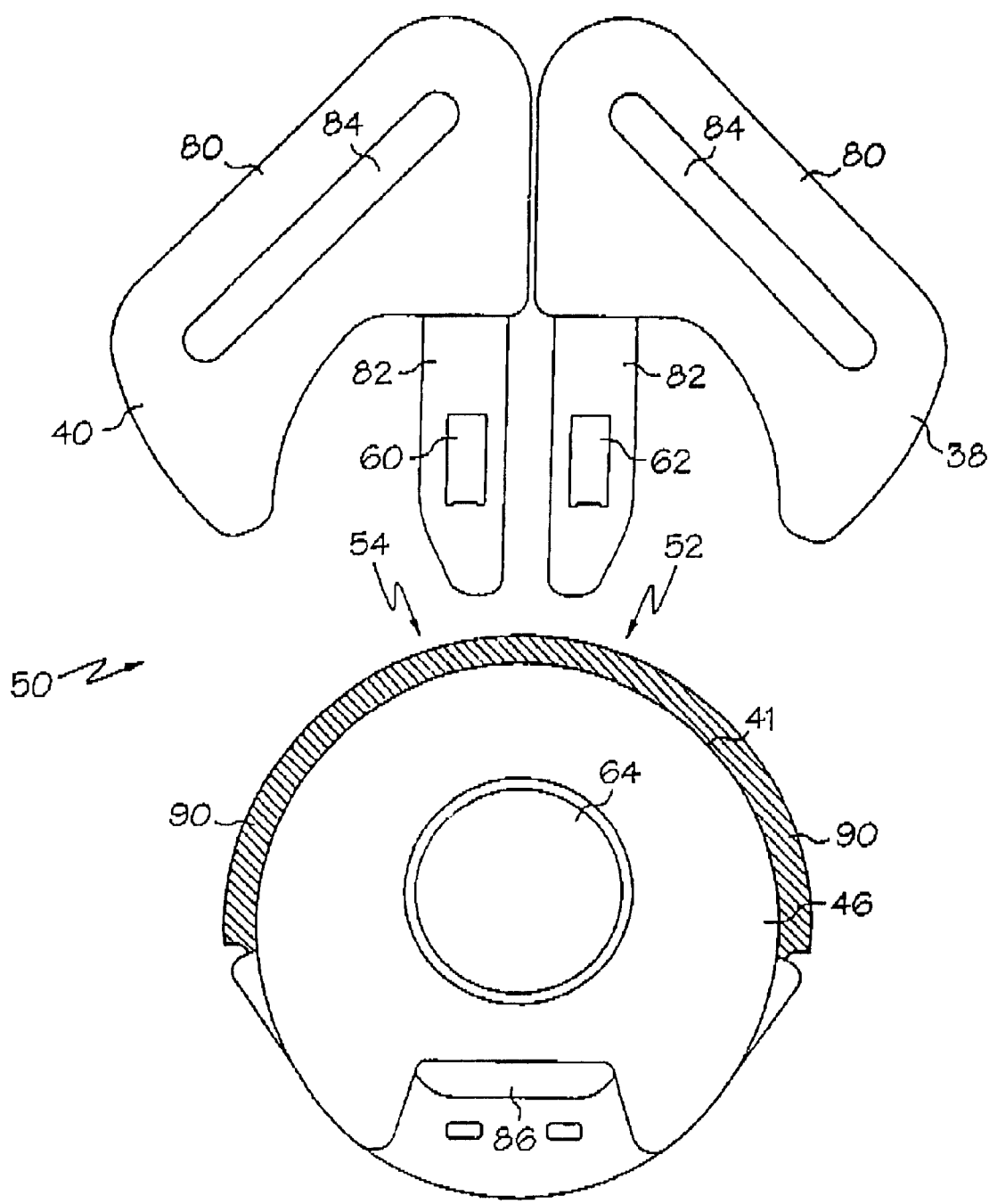
FIG. 6 is a front view of the buckle of the car seat of FIG. 1, shown in its unlatched condition.
Figure 7:
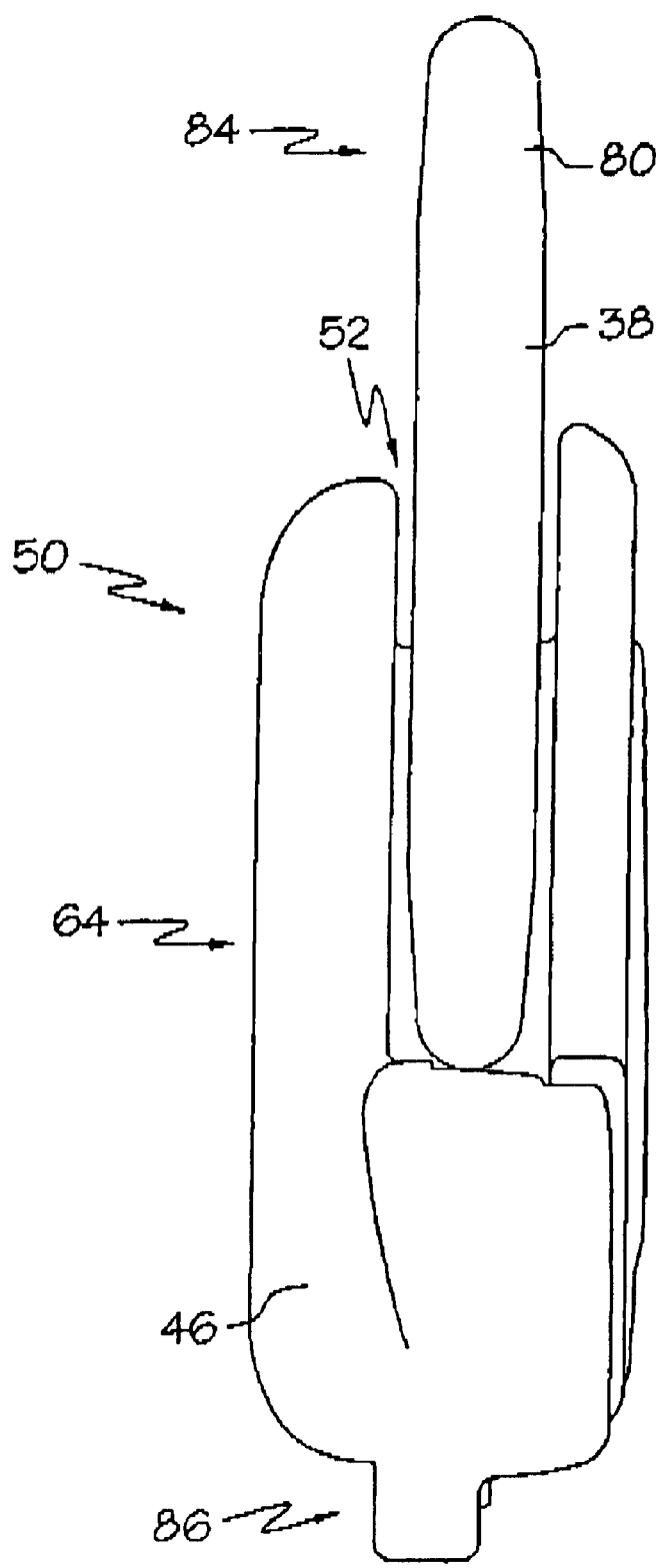
FIG. 7 is a side view of the buckle of the car seat of FIG. 1.

The buckle 50 includes a base 46 that is coupled to the seat pan 14 by a belt buckle 48 passed through a slot 86 of the base 46. As shown in FIGS. 6 and 7, the base 46 has a pair of slots or openings 52, 54 formed along the top edge thereof, and each tongue 81, 82 is shaped to be passed through one of the slots 52, 54 of the base 46 and releasably received in the base 46. For example, in one embodiment the base 46 includes one or more spring biased latches (not shown) and each spring biased latch can be received in one of the opening 60, 62 to couple the brackets 38, 40 to the base 46. The button 64 is actuable to move the spring biased latch or latches out of engagement with each tongue 81, 82 such that each tongue 81, 82 can be removed from the base 46, as in a standard buckle for a car seat or standard seat belt. When each tongue 38, 40 is securely received in the base 46, the lower surface of each gripping portion 80 abuts against or is located adjacent to the base 46, and the buckle 50 is in its latched condition. However, it should be understood that any of a wide variety of mechanisms for coupling the tongues 81, 82 and brackets 38, 40 to the base 46 may be used without departing from the scope of the invention.

As shown in FIG. 6, the base 46 preferably includes a background portion, or notification portion 90, that is made of a color or material so as to attract the attention of a user. In other words, the notification portion 90 preferably has a visual property that is distinct from other adjacent, visual portions of the buckle 50, and is preferably visually distinct from any other portions of the buckle 50, particularly when the buckle 50 is in its latched or near-latched condition. For example, the notification portion 90 preferably may have a color (i.e. bright yellow or red) or material property (i.e. roughened, smooth, reflective, shiny, bumpy, etc.) or other property that is different from the majority of the rest of the base 46 or buckle 50 and that is visible to a user when latching the buckle 50 (i.e., that is visible from a front side of the car seat 10).

In the illustrated embodiment the notification portion 90 extends generally upwardly from an upper surface 41 of the base 46 and preferably extends around a significant portion of the perimeter of the base 46, such as about ¼" to about ½" or more of the perimeter. The notification portion 90 is preferably located in a prominent position and sized to be large enough to be immediately visible to the user. For example, in the illustrated embodiment the notification may have a height of about ³⁄₁₆" and extend for about 4½" around the perimeter of the base such that the notification has a surface area of about 0.84 square inches. However, the surface area of the notification portion may be increased or decreased as desired, and may be, for example, as small as about 0.35 square inches or less.

Figure 4:
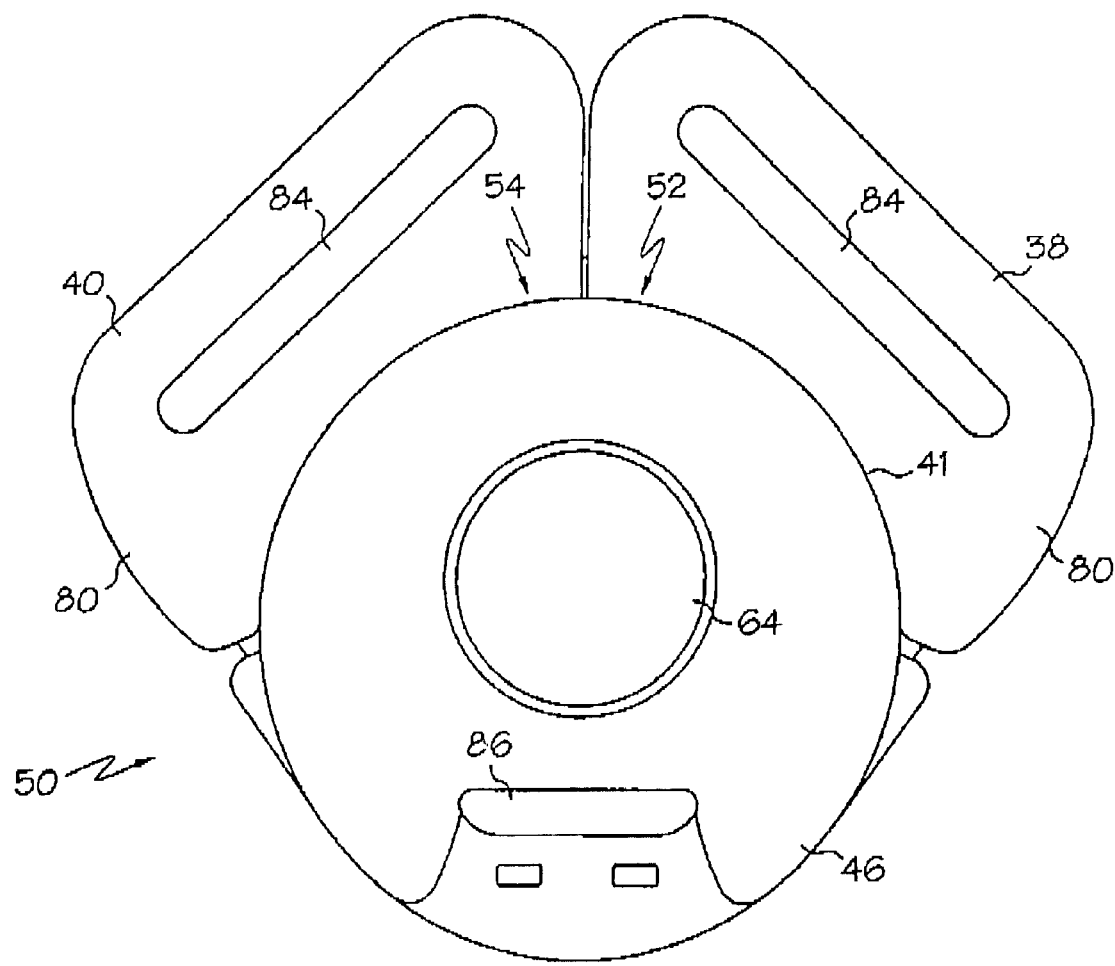
FIG. 4 is a front view of the buckle of the car seat of FIG. 1, shown in its latched condition.
Figure 5:
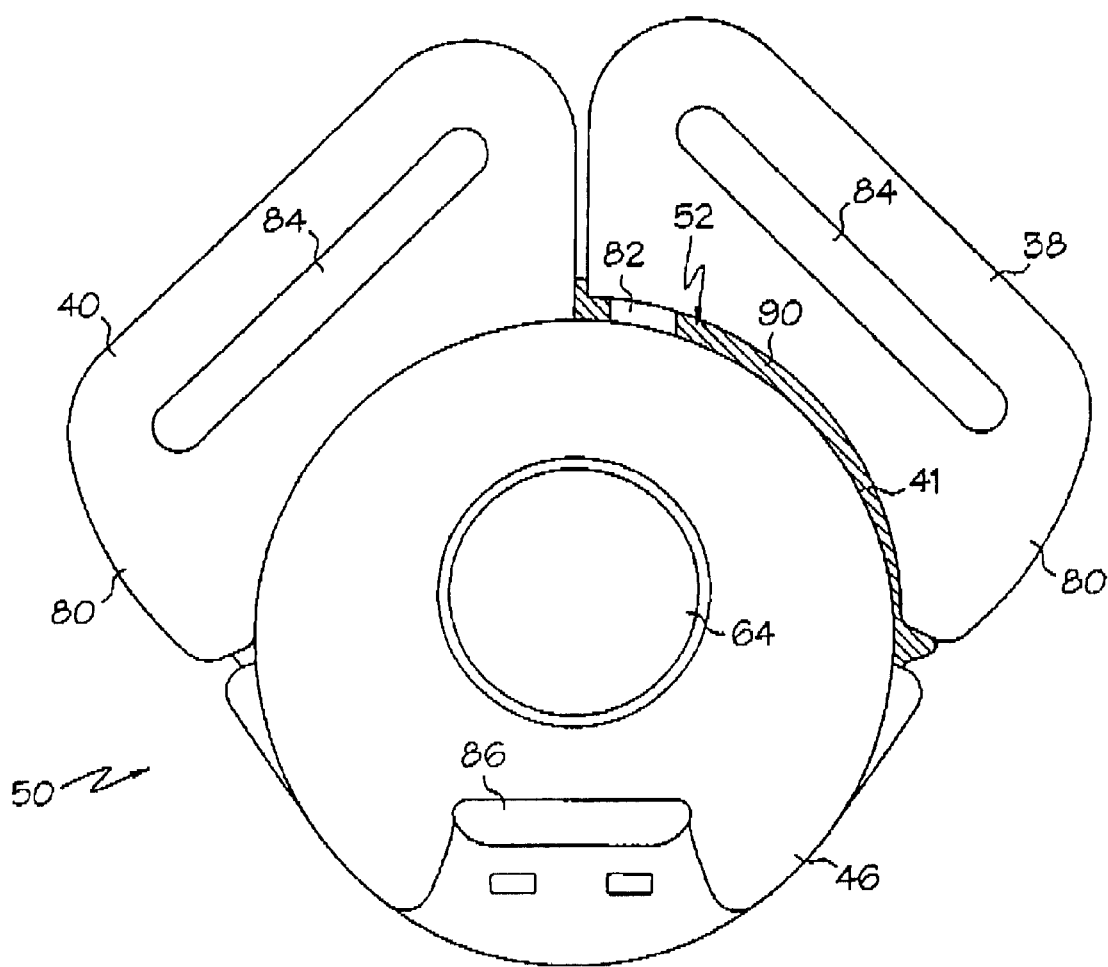
FIG. 5 is a front view of the buckle of FIG. 4, with one of the brackets in an unlatched condition.

The notification portion 90 provides visual feedback to a user to confirm that the buckle 50 is properly latched. When the notification portion 90 is visible, the user knows that one or both of the brackets 38, 40 are not properly received in the base 46, and that the buckle 50 is not latched. For example, FIG. 5 illustrates the buckle 50 wherein bracket 38 is not fully received in the base 46, and the notification portion 90 is visible between the bracket 38 and base 46. In contrast, when the notification portion 90 is not visible or is generally obscured, as shown in FIG. 4, the user knows that the buckle 50 is properly latched. In this manner, the buckle 50 of the present invention helps to confirm that the child is securely received in the car seat.

In an alternate embodiment, the brackets 38, 40 may only obscure or change the visual property of the notification portion. For example, the notification portion 90 may be made of the color yellow, and the brackets 38, 40 may include colored translucent portions (i.e., blue translucent panels) such that the notification portion 90 appears green when the buckle 50 is latched. Of course, various other methods for obscuring or varying the properties of the notification portion 90 can be used without departing from the scope of the invention. Further, instead of being located on the base 46, the notification portion 90 may be located on the brackets 38, 40 such that the notification portion is located behind the base 46 and therefore hidden from view or otherwise obscured when the buckle 50 is in its latched condition. In this case, the notification portion 90 is preferably located on the gripping portion 80 of each base.

Although FIGS. 1 and 2 illustrate one embodiment of a car seat, it should be understood that the buckle 50 of the present invention may be used in nearly any car seat. In particular, many car seats include shoulder harnesses that pass through an opening in the seat back and extend along the seat back and to a tensioning mechanism located below the seat pan. The buckle 50 of the present invention can be used in nearly any car seat wherein it is desired to couple a shoulder harness to the base or seat pan, including but not limited to the car seats described above. Furthermore, although the invention is described and shown in use with a pair of brackets 38, 40, the invention may also be used in a car seat including only a single bracket. For example, the brackets 38, 40 maybe coupled together, such as by a locking clip or the like, to form a single "bracket" that can then be coupled to the base 46.

Having described the invention in detail and by reference to the preferred embodiments, it will be apparent that modifications and variations thereof are possible without departing from the scope of the invention.

What is claimed is:

1. A car seat comprising:
    a seat body having a seat back and a seat pan for receiving an occupant thereon;
    at least one shoulder harness coupled to said seat body and being located to fit over the torso of an occupant to retain said occupant on said seat body; and
    a buckle for releasably coupling said shoulder harness to said seat body, said buckle including a bracket coupled to said shoulder harness and a base coupled to said seat body, said bracket including a gripping portion and a tongue and being releasably couplable to said base, said buckle being in a latched condition when said bracket is coupled to said base and being in an unlatched condition when said bracket is not coupled to said base, and wherein one of said gripping portion or said base includes a notification portion that has a visual property different from any adjacent areas of said one of said gripping portion or said base, and wherein said notification portion is visible when said buckle is in said unlatched condition and wherein said visual property of said notification portion is generally obscured by the other of said gripping portion or said base when said buckle is in said latched condition.

2. The car seat of claim 1 wherein said base includes a lower surface facing said seat pan and an upper surface located on a generally opposite end of said base, and wherein said notification portion is located on said upper surface of said base.

3. The car seat of claim 2 wherein said notification portion extends along at least about ¼ of the perimeter of said base.

4. The car seat of claim 1 wherein said notification portion has a color different from adjacent areas of said buckle when said buckle is in said latched condition.

5. The car seat of claim 1 wherein said base includes a base opening, and wherein said tongue is received in said base opening when said buckle is in said latched condition.

6. The car seat of claim 5 wherein said tongue including a tongue opening, and wherein said base includes a spring-loaded latch that is received in said tongue opening when said buckle is in said latched condition.

7. The car seat of claim 1 wherein said notification has a surface area of at least 0.35 square inches.

8. The car seat of claim 1 further comprising a base belt coupled to said seat pan and to said base to thereby couple said base to said seat pan.

9. The car seat of claim 1 wherein said base includes a base opening and said tongue includes a tongue opening and is shaped to be received in said base opening, said gripping portion being located adjacent to said base when said buckle is in said latched condition, and wherein said notification portion is located on said gripping portion.

10. A car seat comprising:
    a seat body having a seat back and a seat pan for receiving an occupant thereon;
    a pair of shoulder harnesses coupled to said seat body and being located to fit over the torso of an occupant to retain said occupant on said seat body; and
    a buckle for releasably coupling said shoulder harnesses to said seat body, said buckle including a pair of brackets, each bracket being coupled to one of said shoulder harnesses, and a base coupled to said seat body, each bracket being shaped to be releasably coupled to said base, said buckle being in a latched condition when each bracket is coupled to said base and being in an unlatched condition when at least one of said brackets is not coupled to said base, and wherein said base includes a notification portion that has a visual property different from any adjacent areas of said brackets or said base when said buckle is in said latched condition, and wherein each bracket is located in front of said notification portion to generally cover said notification portion when said buckle is in said latched condition and wherein at least one of said brackets is not located in front of said notification portion when said buckle is in said unlatched condition such that said notification portion is at least partially visible to a user.

11. A car seat comprising:
   a seat body having a seat back and a seat pan for receiving an occupant thereon;
   at least one shoulder harness coupled to said seat body and being located to fit over the torso of an occupant to retain said occupant on said seat body;
   a bracket coupled to said shoulder harness; and
   a base coupled to said seat body, said bracket including a tongue portion and a gripping portion and being shaped to be releasably coupled to said base, and wherein one of said gripping portion or said base includes a notification portion that has a visual property different from any adjacent areas of the associated one of said gripping portion or said base, and wherein the other one of said gripping portion or base covers said notification portion when said bracket is coupled to said base and wherein said other one of said gripping portion or base does not cover said notification portion when said bracket is not coupled to said base such that said notification portion is at least partially visible to a user.

12. A method for securing an occupant in a car seat comprising the steps of:
   providing a car seat having a seat body having a seat back and a seat pan for receiving an occupant thereon, at least one shoulder harness coupled to said seat body, and a buckle including a bracket coupled to said shoulder harness and a base coupled to said seat body, wherein said base includes a notification portion that has a visual property different from any adjacent areas of said base, said notification portion being generally visible to a user when said bracket is not coupled to said base;
   locating an occupant on said seat body;
   locating said shoulder harness over a torso of said occupant; and
   coupling said bracket to said base to couple said shoulder harness to said base such that said bracket generally covers said notification portion such that said notification portion is generally not visible to a user.

13. The car seat of claim 1 wherein said base defines an inner volume which can receive at least part of said tongue therein when said buckle is in said latched condition, and wherein said notification portion is at least partially located outside of said inner volume.

14. The car seat of claim 1 wherein the other of said gripping portion or said base is located between said notification portion and a front of said car seat when said buckle is in said latched condition.

15. The car seat of claim 10 wherein said base defines an inner volume which can receive at least part of each bracket therein when said buckle is in said latched condition, and wherein said notification portion is at least partially located outside of said inner volume.

16. The car seat of claim 10 wherein each bracket is located between said notification portion and a front of said car seat when said buckle is in said latched condition such that said notification portion is generally not visible to a user.

17. The car seat of claim 11 wherein said base defines an inner volume which can receive at least part of each tongue portion therein when said buckle is in said latched condition, and wherein said notification portion is at least partially located outside of said inner volume.

18. The car seat of claim 11 wherein the other one of said gripping portion or said base is located between said notification portion and a front of said car seat when said buckle is in said latched condition.

19. The method of claim 12 wherein said base defines an inner volume which can receive at least part of said bracket therein when said buckle is in said latched condition, and wherein said notification portion is at least partially located outside of said inner volume.

20. The method of claim 12 wherein said gripping portion is located between said portion and a front of said car seat when said buckle is in said latched condition.

21. A car seat comprising:
   a seat body having a seat back and a seat pan for receiving an occupant thereon;
   at least one shoulder harness coupled to said seat body and being located to fit over the torso of an occupant to retain said occupant on said seat body;
   a bracket coupled to said shoulder harness, said bracket including a tongue portion and a gripping portion; and
   a base directly or indirectly coupled to said seat body, said bracket being shaped to be releasably coupled to said base such that said bracket is in a locking position, said bracket being in an unlocked position when said bracket is not coupled to said base, and wherein one of said.

* * * * *